United States Patent
Eckert et al.

(10) Patent No.: US 6,624,424 B2
(45) Date of Patent: Sep. 23, 2003

(54) VUV LASER BEAM CHARACTERIZATION SYSTEM

(75) Inventors: Gerd Eckert, Goettingen (DE); Klaus Mann, Goettingen (DE); Klaus Vogler, Goettingen (DE)

(73) Assignee: Lambda Physik AG, Goettingen (DE)

( * ) Notice: Subject to any disclaimer, the term of this patent is extended or adjusted under 35 U.S.C. 154(b) by 203 days.

(21) Appl. No.: 09/780,124

(22) Filed: Feb. 9, 2001

(65) Prior Publication Data

US 2003/0150997 A1 Aug. 14, 2003

Related U.S. Application Data (60) Provisional application No. 60/181,156, filed on Feb. 9, 2000.

(51) Int. Cl.$^7$ ................................................. G01J 1/42
(52) U.S. Cl. .......................................... 250/372; 372/29
(58) Field of Search ............................. 250/372, 201.8; 372/29, 55, 59

(56) References Cited

U.S. PATENT DOCUMENTS

| | | | | |
|---|---|---|---|---|
| 4,707,836 A | * | 11/1987 | Travis | 372/29.021 |
| 5,872,626 A | * | 2/1999 | Lipscomb | 356/141.3 |
| 6,002,697 A | | 12/1999 | Govorkov et al. | 372/34 |
| 6,014,206 A | | 1/2000 | Basting et al. | 356/138 |
| 6,020,723 A | | 2/2000 | Desor et al. | 320/166 |

FOREIGN PATENT DOCUMENTS

DE  40 09 826 A  10/1991  ............. G01J/5/26

OTHER PUBLICATIONS

K. Mann, et al., "Monitoring and Shaping of Excimer Laser Beam Profiles," *Proceedings of OE Technology, Boston, MA(USA) SPIE*, vol. 1834, 1992, pp. 184–194.

H.S. Albrecht, et al., "Measurement and Evaluation Methods for Beam Characterization of Commerical Excimer Lasers," *Proceedings of 3$^{rd}$ International Workshop on Laser Beam and Optics Characterization (LBOC) Quebec, Canada, SPIE*, vol. 2870, Jul. 1996, pp. 354–359.

S. Bollanti, et al., "Beam Quality Characterization and Times–Diffraction–Limit Estimation of Two–High–Power Excimer Lasers," *Proceedings of 3$^{rd}$ International Workshop on Laser Beam and Optics Characterization (LBOC) Quebec, Canada, SPIE*, vol. 2870, Jul. 1996, pp. 360–366.

K. Mann, et al., "Characterization of Excimer Laser beam Parameters," *Proceedings of 3$^{rd}$ International Workshop on Laser Beam and Optics Characterization (LBOC) Quebec, Canada, SPIE*, vol. 2870, Jul. 1996, pp. 367–377.

(List continued on next page.)

*Primary Examiner*—David Porta
*Assistant Examiner*—Christine Sung
(74) *Attorney, Agent, or Firm*—Stallman & Pollock LLP (57) ABSTRACT

A beam characterization monitoring apparatus receives an input VUV beam and measures a beam profile characteristic of the beam. An enclosure has an interior substantially free of VUV photoabsorbing species and configured for receiving the input VUV beam therein. Optics within the enclosure separate the input VUV beam into a first component for measuring a near field beam profile characteristic and a second component for measuring a far field beam profile characteristic. A detector coupled with the enclosure via a beam path substantially free of VUV photoabsorbing species preferably detects the first and second components simultaneously. A quantum converter is preferably disposed along the beam path before the detector for converting the VUV beam to a beam having a wavelength above 240 nm. A second detector preferably detects an energy of an additional component of the input VUV beam.

45 Claims, 6 Drawing Sheets

OTHER PUBLICATIONS

H.S. Albrecht, et al., Single Pulse Diagnosis of Energy Distributions on Excimer Lasers with High Repetition Rates, *Proceedings of 4th International Workshop on Laser Beam and Optics Characterization (LBOC)*, Jun. 1997, pp. 287–297.

ISO Publication No.: 11670: Laser and laser–related equipment—Test methods for laser beam parameters—Beam positional stability, *ISO/FDIS 11670*, 1999, 8 pages.

ISO Publication No.: 11146: Lasers and laser–related equipment—Test methods for laser beam parameters—Beam widths, divergence angle and beam propagation factor, 1999, 32 pages.

ISO Publication No.: 13694: Optics and optical instruments—Lasers and laser–related equipment—Test methods for laser beam power [energy] density distribution, 2000, 22 pages.

* cited by examiner

VUV LASER BEAM CHARACTERIZATION SYSTEM

PRIORTY

This application claims the benefit of priority to U.S. provisional patent application No. 60/181,156, filed Feb. 9, 2000.

BACKGROUND OF THE INVENTION

1. Field of the Invention

The invention relates to a beam characterization system, and particularly to an apparatus for monitoring VUV excimer and molecular fluorine laser beam parameters.

2. Discussion of the Related Art

It is recognized herein that there are additional considerations to designing a vacuum ultraviolet (VUV) beam characterization system than for conventional beam characterization, e.g., for deep ultraviolet (DUV) lasers such as the KrF excimer laser and for other lasers having wavelengths above 200 nm. First, conventional CCD cameras tend to degrade in performance when a VUV beam is incident on the camera. Second, the beam path for a VUV beam will be filled with VUV photoabsorbing species unless extra measures are taken to prepare the beam path so that the beam can reach the detector without substantial attenuation by these VUV absorbing species. It is therefore desired to have a system for VUV beam characterization or diagnosis without substantial detector degradation or beam attenuation that would otherwise occur if conventional 200 nm+systems were used for characterizing the VUV beam. It is also desired to have a compact and efficient beam characterization system.

SUMMARY OF THE INVENTION

In accordance with the above, a beam characterization monitoring apparatus is provided for receiving an input VUV beam and measuring a beam profile characteristic of the beam. An enclosure has an interior substantially free of VUV photoabsorbing species and configured for receiving the input VUV beam. A beam splitter separates the input VUV beam into a first component for measuring a near field beam profile characteristic and a second component for measuring a far field beam profile characteristic. A detector is coupled with the enclosure via a beam path substantially free of VUV photoabsorbing species and detects at least one of the first component and the second component.

Further in accordance with the above, a beam characterization monitoring apparatus is provided for receiving an input VUV beam and measuring a beam profile characteristic of the beam. An enclosure has an interior substantially free of VUV photoabsorbing species and configured for receiving the input VUV beam. A detector is coupled with the enclosure via a beam path substantially free of VUV photoabsorbing species and detects a beam profile characteristic of the input VUV beam. A quantum converter is disposed along the beam path before the detector for converting the VUV beam into a beam having a wavelength above 240 nm.

Further in accord with the above, a beam characterization monitoring apparatus is provided for receiving an input VUV beam and measuring a beam profile characteristic of the beam. An enclosure has an interior substantially free of VUV photoabsorbing species and configured for receiving the input VUV beam. A beam splitter separates the input VUV beam into a first component for measuring a beam profile characteristic and a second component for measuring an energy characteristic of the input VUV beam. A first detector is coupled with the enclosure via a beam path substantially free of VUV photoabsorbing species and detects the first component. A second detector is coupled with the enclosure via a beam path substantially free of VUV photoabsorbing species and detects the second component.

Further in accord with the above object, a beam characterization monitoring apparatus is provided for receiving an input VUV beam and measuring a beam profile characteristic of the beam. An enclosure has an interior substantially free of VUV photoabsorbing species and configured for receiving the input VUV beam. A detector is coupled with the enclosure via a beam path substantially free of VUV photoabsorbing species and detects a far field beam profile of the input VUV beam. A focusing lens focuses the far field beam profile of the VUV input beam to the detector for measuring a far field beam profile characteristic of the VUV input beam.

Further in accord with the above object, a beam characterization monitoring apparatus is provided for receiving an input VUV beam and measuring a beam profile characteristic of the beam. An enclosure has an interior substantially free of VUV photoabsorbing species and configured for receiving the input VUV beam. A detector is coupled with the enclosure via a beam path substantially free of VUV photoabsorbing species and detects a near field beam profile of the input VUV beam.

INCORPORATION BY REFERENCE

What follows is a cite list of references each of which is, in addition to those references cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

K. Mann, et al., "Monitoring and Shaping of Excimer Laser Beam Profiles", Proceedings of OE Technology, Boston (USA), SPIE Vol. 1834, 184 (1992);

H. S. Albrecht, et al., "Measurement and Evaluation Methods for Beam Characterization of Commercial Excimer Lasers", Proceedings of 3rd International Workshop on Laser Beam and Optics Characterization (LBOC) Quebec, Canada, Jul. 1996, SPIE Vol. 2870, 354 (1996);

S. Bollanti, et al., "Beam Quality Characterization and Times-Diffraction-Limit Estimation of Two High-Power Excimer Lasers", Proceedings of 3rd International Workshop on Laser Beam and Optics Characterization (LBOC), Quebec, Canada, Jul. 1996, SPIE Vol. 2870, 360 (1996);

H. S. Albrecht, et al., "Single Pulse Diagnostics of Energy Density Distributions on Excimer Lasers with High Repetition Rates, Proceedings of 4th International Workshop on Laser Beam and Optics Characterization (LBOC), p. 287, Munich, (Jun. 1997);

K. Mann, et al., "Characterization of Excimer Laser Beam Parameters", Proceedings of 3rd International Workshop on Laser Beam and Optics Characterization (LBOC), Quebec, Canada, Jul. 1996, SPIE Vol. 2870, 367 (1996); and U.S. Pat. No. 6,014,206; and U.S. patent applications Ser. No. 09/512,417, 09/475,775, 09/598,552, 60/166,952, 60/177,809 and 09/172,805, which are assigned to the same assignee as the present application.

DETAILED DESCRIPTION OF THE PREFERRED EMBODIMENTS

Preferred embodiments of a beam characterization system for an excimer or molecular fluorine laser are described below. The system includes an enclosure having an interior substantially free of VUV photoabsorbing species and a window for receiving an input VUV beam. The system may include optics for splitting the laser beam into at least two beam portions that travel along separate optical paths before reaching an array detector or CCD camera. The preferred detector monitors the near field beam profile by detecting the beam portion that follows the first optical path and the far field beam profile by detecting the beam portion that follows the second optical path. A first lens, preferably an imaging lens, is positioned along the first optical path and a second lens, preferably a focusing lens, may be positioned along the second optical path. A third beam portion preferably follows a third optical path and is received at an energy detector for monitoring an energy of the beam.

The beam characterization monitor may be preferably used for beam diagnosis for molecular fluorine (157 nm) and argon fluoride (193 nm) laser beams, and may be advantageously used for beam diagnosis of other lasers, such as frequency multiplied solid state and $Ar_2$ lasers, emitting at wavelengths under 200 nm.

The enclosure contains beam characterization optics for the system and is disposed outside of the laser resonator. The enclosure is preferably evacuated or purged with an inert gas, or may be evacuated and purged once or repeatedly to remove VUV photoabsorbing species for the VUV beam path.

A quantum converter is disposed before the detector, which is preferably an array detector or CCD camera or other position sensitive detector for detecting an image, to allow near and far field beam profile analysis without camera degradation. The quantum converter allows the VUV beam profiles to be measured without degradation of the camera, such that cameras typically used for DUV beam detection, such as for 248 nm, or those used for detecting longer wavelengths such as visible wavelengths, and that would ordinarily degrade upon incidence by a VUV beam, can be used. Projection onto the detector through the quantum converter is preferably done through an imaging lens for measuring the near field profile, and through a focusing lens for measuring the far field profile. The near and far field profiles may be measured simultaneously or separately without adjusting the optics. Many of the optics may, however, be adjustable without spoiling the interior of the enclosure by vacuum feedthroughs to the optics.

Single pulse energies, average pulse energies or average power of the beam may also be measured, preferably simultaneously and using a split off portion of the same beam portion used for the near and far field characterization, using an energy detector. In addition, the diagnostic beam used for measuring the beam profiles and preferably the beam energy may itself be split off from a main laser beam before or within the enclosure, wherein the main beam is used, e.g., for industrial application processing.

According to the preferred arrangement using beam folding and particular optical mounting techniques, the setup has excellent compactness and high stability. During operation, the near and far field beam paths may be adjusted without contaminating the atmosphere within the enclosure, and while simultaneously measuring energy and beam profile characteristics.

Figure 1:
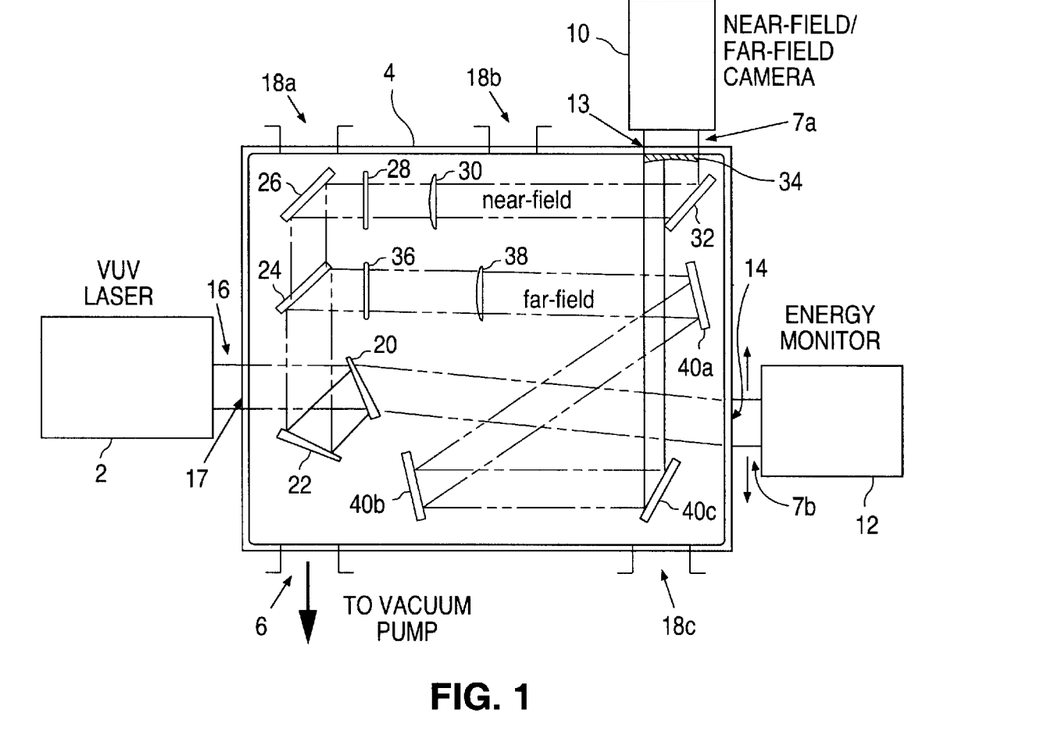
FIG. 1 schematically shows an optical arrangement for near and far field beam profile measurement according to a preferred embodiment.

FIG. 1 schematically shows an optical arrangement for near and far field beam profile measurement according to a preferred embodiment. FIG. 1 shows a VUV laser emitting a VUV laser beam having a wavelength below 200 nm. Examples of such lasers includes the molecular fluorine laser emitting around 157 nm, the ArF excimer laser emitting around 193 nm, a frequency multiplied solid state laser emitting including a solid state laser typically emitting a visible or infrared wavelength beam and a frequency multiplying crystal such as BBO or CLBO for reducing the wavelength to below 200 nm (see, e.g., U.S. Pat. No. 6,002,697 and U.S. patent application Ser. No. 09/599,130, which is assigned to the same assignee as the present application, which are each hereby incorporated by reference), and the $Ar_2$ laser emitting around 122 nm, among others known to those skilled in the art. Preferred molecular fluorine and ArF laser systems are set forth at U.S. Pat. No. 6,020,723 and U.S. patent applications Ser. Nos. 09/453, 670, 09/602,184, 09/599,130, 09/598,552, 09/574,921, 09/629,256, 09/640,595, 09/734,459, 09/692,265, 09/715, 803, 09/686,483 and 09/688,561, which are assigned to the same assignee as the present application and are hereby incorporated by reference.

An enclosure 4 is shown in FIG. 1 for receiving an output VUV beam from the VUV laser 2. Although not shown, a separate beam splitter module may be disposed between the VUV laser 2 and the enclosure 4. This separate beam splitter module would separate the output VUV beam emitted from the VUV laser 2 into a first component to be received at the enclosure 4 and a main beam to be used for an application process, such as for photolithography, photoablation or micro-machining applications. Examples of the separate beam splitter module are set forth at U.S. patent applications Ser. Nos. 09/598,552, 60/166,952, 60/166,967 and 60/177, 809, which are assigned to the same assignee and are hereby incorporated by reference.

The enclosure 4 is shown having a port 6 for coupling with a vacuum pump (not shown) for removing VUV photoabsorbing species from the enclosure 4. The enclosure 4 preferably has a second port (not shown or connected through a valve assembly to the port 6) for purging the enclosure with an inert gas. A preferred technique for preparing the atmosphere within the enclosure 4 would include pumping the enclosure 4 by opening the port 6 to the vacuum pump followed by backfilling the enclosure 4 with the inert gas. This pumping and backfilling may be performed a number of times (e.g., less than 10) prior to using the enclosure 4. The technique may be similar to that described at U.S. patent applications Ser. Nos. 09/343,333 and /or 09/594,892, which are assigned to the same assignee as the present application are hereby incorporated by reference. Alternatively, the enclosure 4 can be pumped to a very low pressure and maintained at that pressure by continuous pumping. An additional alternative is to continuously flow the inert gas through the enclosure 4 during use of the enclosure 4, either after pumping or in lieu of the pumping. For this purpose, an additional outlet port would be provided either on the enclosure 4 or connected through a valve assembly to the port 6.

The enclosure shown in FIG. 1 also has optical ports 7a and 7b for connecting to a near field/far field camera 10 and an energy detector or energy monitor 12, each for receiving diagnostic beam portions preferably through optical windows 13 and 14, respectively. The optical windows 13 and 14 preferably comprise $CaF_2$. In addition, a port 16 preferably sealably couples with an enclosure of the beam path between the VUV laser 2 and the enclosure 4, or between the separate beam splitter module (see above) and the enclosure 4, for maintaining the beam path to the enclosure 4 free of VUV photoabsorbing species.

Also preferably, a VUV transparent window 17, preferably made of $CaF_2$, is disposed at the port 16. The enclosure 4 shown in FIG. 1 also has additional ports 18a, 18b and 18c for connecting the purge gas inlet and/or outlet, for coupling with additional diagnostic tools and/or for changing the position of the near field/far field camera 10 and/or energy monitor 12. Each of these ports 18a, 18b and 18c would also preferably have a VUV transparent window made of, e.g., $CaF_2$ coupled thereto. Each port 6, 7a, 7b, 18a, 18b, 18c preferably includes a flange for sealing the connected components, e.g., the camera 10, the energy monitor 12 and vacuum tubing (not shown) to the vacuum pump, to the enclosure 4.

The enclosure 4 shown in FIG. 1 also includes a beam splitter 20 for reflecting a portion of the input VUV beam from the laser 2 and for transmitting a portion to the energy monitor 12. The reflected portion is shown reflecting from a mirror 22. After reflecting from the mirror 22, the beam is incident upon another beam splitter 24 which reflects a beam portion along a far field beam path and which transmits a beam portion along a near field beam path. The beam portion transmitted at beam splitter 24 is reflected by a mirror 26. The beam portion reflected from the mirror 26 encounters an attenuator 28 for reducing the energy of the beam portion along the near field beam path. After traversing the attenuator 28, the attenuated beam portion is imaged through a imaging lens 30 after reflection from another mirror 32 onto the camera 10.

After reflection from the mirror 32, however, and before impinging upon the detector 10, the beam is incident on a quantum converter 34. The quantum converter 34 preferably comprises a quartz substrate coated with an inorganic luminous substance. The quantum converter 34 receives the beam after reflection from the mirror 32, absorbs the beam, and re-emits a beam having same or similar properties as the incident beam except that the wavelength is longer, such as greater than 240 nm and may be in the visible spectrum. The quantum converter 34 is shown disposed within the enclosure, and may be otherwise disposed along said beam path that is substantially free of photoabsorbing species coupling the camera 10 with said enclosure 4. The inorganic luminous substance preferably comprises fluorphor $Tb^{3+}$ and may comprise a Tb or Cs doped fluorophor or another quantum conversion coating as know to those skilled in the art. The energy detector 12 is not shown having a quantum converter between it and the beam transmitted at beam splitter 20, and instead comprises PtSi such as in the form of a window or otherwise for preventing degradation, as preferably described at U.S. patent application Ser. No. 60/177,809, incorporated by reference above.

The beam portion reflected at the beam splitter 24 traverses an attenuator 36 which reduces the energy of the beam portion along the far field beam path. The attenuated beam portion is them focused by a focusing lens 38 disposed along the beam path after the attenuator 36. Each of the beam splitters 20 and 24 and each of the lenses 30 and 38 preferably comprise $CaF_2$.

Additional mirrors 40a, 40b and 40c are preferably then disposed at locations for adjusting the far field beam path to the focal length of the lens 38. One or more of the mirrors 40a, 40b and 40c are preferably adjustable for adjusting the far field beam path length and/or beam alignment with respect to the camera 10. Also preferably, the one or more adjustable mirrors 40a, 40b and/or 40c may be adjusted without spoiling the atmosphere within the enclosure 4. This is achieved by sealed mechanical feedthroughs to the mirrors 40a, 40b and/or 40c from exterior handles for manual adjustment or for automatic adjustment with motor drives. The adjustable mirrors 40a, 40b and/or 40c may preferably be translated and rotated. Each of the mirrors shown preferably comprise aluminum on BK7 glass uncoated or alternatively $MgF_2$ uncoated.

After reflection from the mirrors 40a, 40b and 40c, the far field beam portion is directed by the final mirror 40c to the camera 10 via the quantum converter 34. The far field beam portion preferably passes mirror 32 to just clear mirror 32. In this way, the same camera 10 can be used for detecting the near field beam portion reflected from mirror 32 and the far field beam portion reflected from mirror 40c. The near field beam portion is received at one side of the camera 10 and the far field beam portion is received at the other side of the camera 10. This allows the near field and far field beam portions to be received at the camera simultaneously. Alternatively, two cameras can be used either side by side, one on top of the other or spaced apart.

Figure 2:
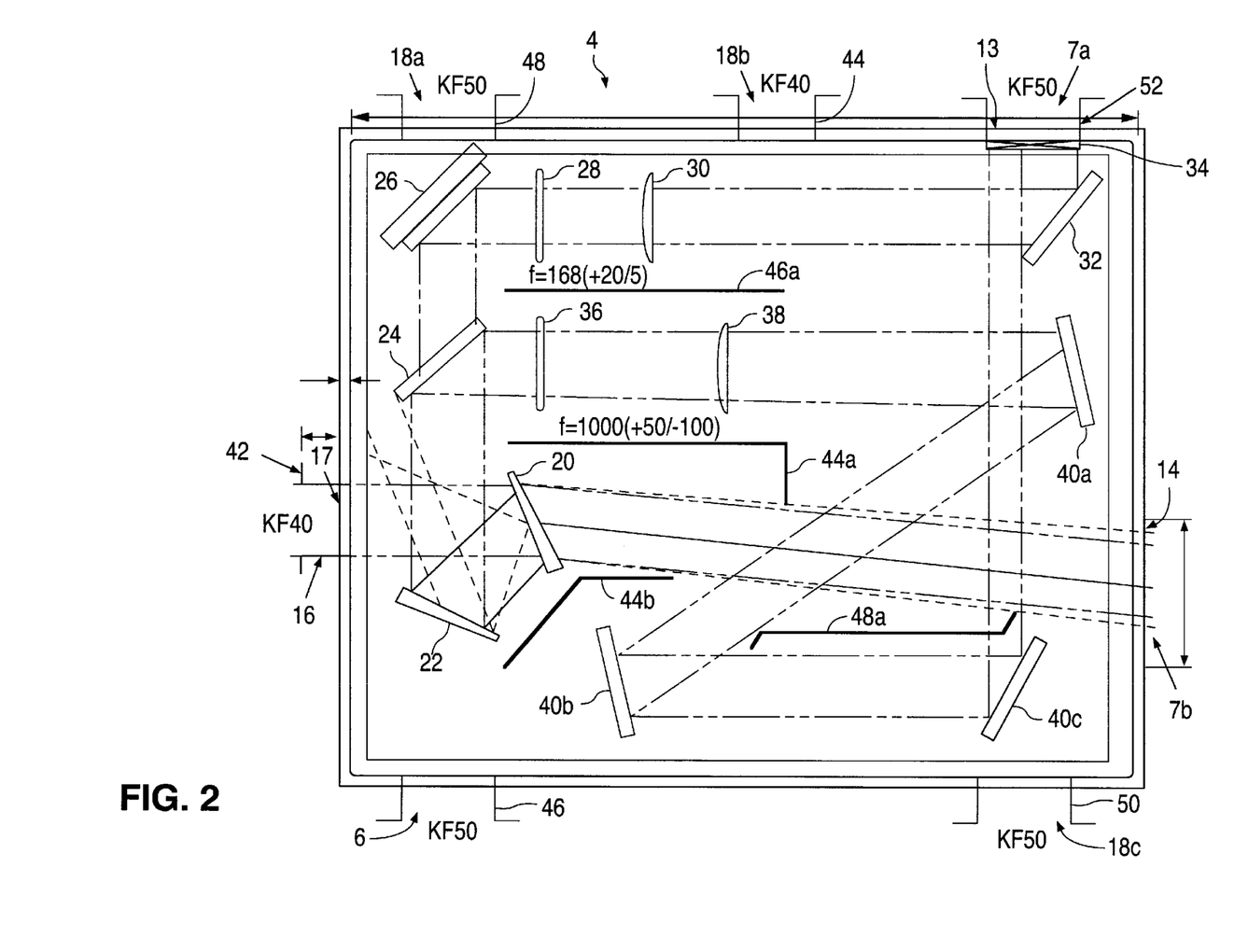
FIG. 2 schematically shows the optical arrangement of FIG. 1 in more schematic detail.

FIG. 2 schematically shows the optical arrangement of FIG. 1 in more schematic detail. A description of those elements already described above with reference to FIG. 1 will not be repeated here. Blocking members 44a and 44b are shown for passing through a predetermined portion of the beam transmitted at beam splitter 20, and blocking stray light from exiting the enclosure 4 particularly at the diagnostic ports 7a and 7b. Additional blocking members 46a and 48a are shown for also blocking light from passing therethrough. The blocking member 48a is shown influencing the far field beam portion between reflections at mirror 40a and 40b and also after reflection from mirror 40c, as well the portion transmitted by beam splitter 20.

A total of six flanges are shown coupling to the ports 16, 6, 18a, 18b, 18c, and 7a. Although not shown, an additional flange may be coupled at the port 7b for sealably coupling the enclosure 4 with the energy detector 12. A flange 42, preferably of type KF40, is shown connected at port 16. The flange 42 is for coupling with an enclosure from the VUV laser 2 of FIG. 1 or from a separate beam splitter module after the laser 2, as described above. Flange 44 is also of KF40 type and is coupled at port 18b. Flange 46 is for coupling to the vacuum tubing of connected with the vacuum pump, and is preferably of KF50 type, and are the flanges 48 and 50 coupled to ports 18a and 18c, respectively. Flange 52, preferably of KF50 type, is shown coupled at port 7a for coupling with the camera 10 or a sealed enclosure leading to the camera 10.

The dimensions of the enclosure 4 are shown to be 440 mm by 340 mm, wherein the long dimension is parallel to the near and far field beam portions as they traverse the imaging lens 30 and focusing lens 38, respectively, and the short dimension is parallel to the near and far field beam portions as they enter the camera 12. The flanges 42, 44, 46, 48, 50 and 52 each are shown extending from their respective ports 16, 18b, 6, 18a, 18c and 7a by 25 mm. The walls of the enclosure are shown to be 5 mm thick. The ports 16, 18b, 6, 18a, 18c, 7a and 7b ar preferably 75 mm across. The preferred imaging lens 30 has a focal length of around 176.2 mm or as shown, f=168 (+20/−5), and the preferred focusing lens 38 has a focal length of around 934.7 mm or as shown, f=1000 (+50/−100). The reduction scale is preferably around 2:1 and the focal plane is preferably around 1 cm before the flange 52. A maximum beam diameter within the enclosure 4 is preferably around 40 mm.

Figure 3:
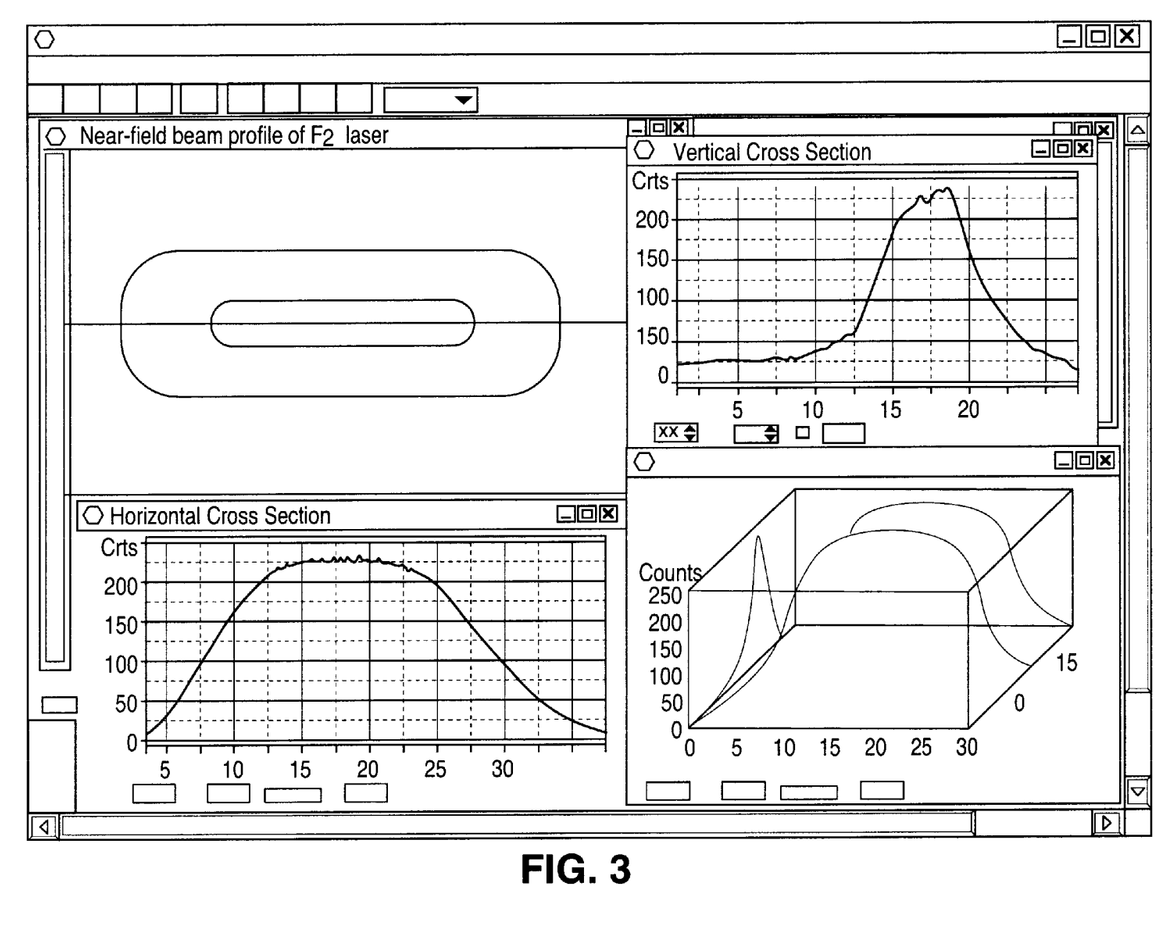
FIG. 3 illustrates results of a near field beam profile measurement according to the preferred embodiment.

FIG. 3 illustrates results of a near field beam profile measurement according to the preferred embodiment. FIG. 3 shows an elongated horizontal cross section which ideally has a "top hat" signature. The vertical cross section more closely approximately to a gaussian form than the horizontal cross section, but as shown and described with respect to FIG. 4, below, each approximates more closely to a super-gaussian fit. Three dimensional renditions are also possible. The camera 10 sends the near field information it receives, i.e., on its right hand side (see FIG. 1) to a processor (not shown). The processor then generates the real profile, the horizontal and vertical cross sections and the three-dimensional rendition from the date using software that it accesses for this purpose. FIG. 3 is actually a display view generated by the processor from the data.

Figure 4A:
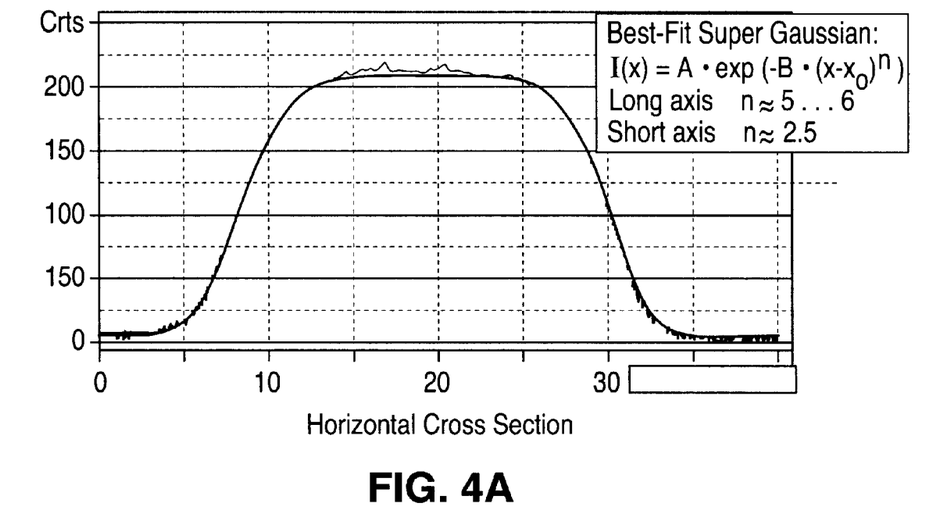
FIG. 4 illustrates a fitting to measured results of a near field beam profile according to a preferred embodiment.
Figure 4B:
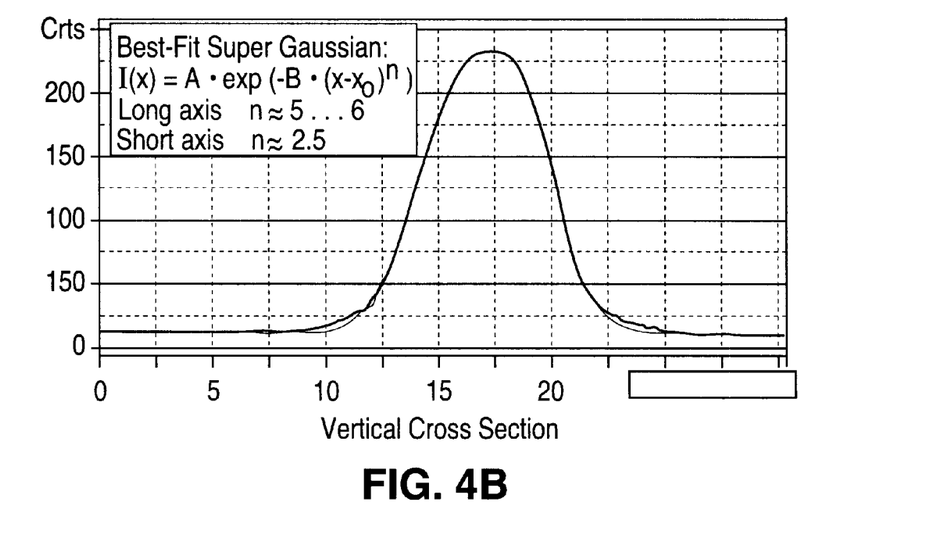

FIG. 4 illustrates a fitting to measured results of a near field beam profile according to a preferred embodiment. FIG. 4 shows a horizontal cross section and vertical cross section of the fitted data. The data was best fit to a super-gaussian, or $I(x)=A\times\exp[-B\times(x-x_o)^n]$, wherein for the long axis n is approximately between 5 and 6 and for the short axis n is about 2.5, as shown.

Figure 5:
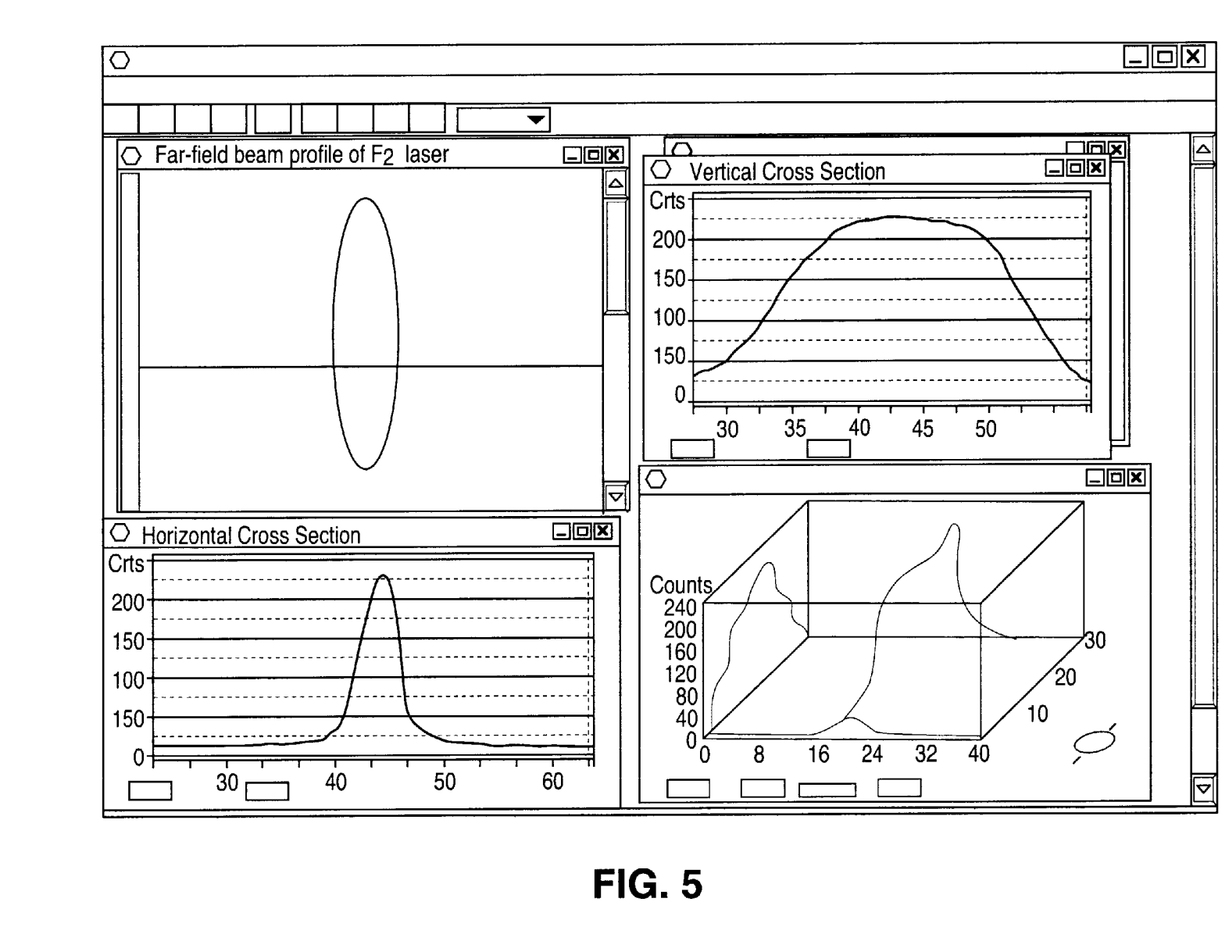
FIG. 5 illustrates results of a far field beam profile measurement according to the preferred embodiment.

FIG. 5 illustrates results of a far field beam profile measurement according to the preferred embodiment. As shown, the far field profile is rendered in the display view shown at FIG. 5 as generated by the processor using data received from the camera 10, i.e., at its left hand side (see FIG. 1). A actual view and horizontal and vertical cross sections, as well as a three-dimensional rendering are shown in FIG. 5. The far field beam profile has a cross section elongated in the vertical direction.

The measurement of the spatial beam profile and evaluation of beam parameters is preferably according to International Standards Organization publications ISO 11146, ISO 13694 and ISO 11670, which are hereby incorporated by reference. Background subtraction is performed, i.e., $H(x,y)=H_{meas}(x,y)-H_{back}(x,y)$.

For the near field profile, the centroid (1st moment) is ($x_c$, $y_c$) and the positional stability is $\Delta_x=2s_x$. The beam diameter (x,y) has a second moment $d_{\sigma x}=4\sigma_x$ and a moving slit $d_{Sx}=x_2\exp(1/e^2)-x_1\exp(1/e^2)$. The effective irradiation area is $A_{eff}(\eta)$ $0<\eta<H_{max}$. The plateau uniformity is $U_p$ and the edge steepness is s.

For the far field profile, the divergence (x,y) is $\Theta=d/f$. The centroid directional stability is $\delta_x=2s_x/f$.

Figure 6:
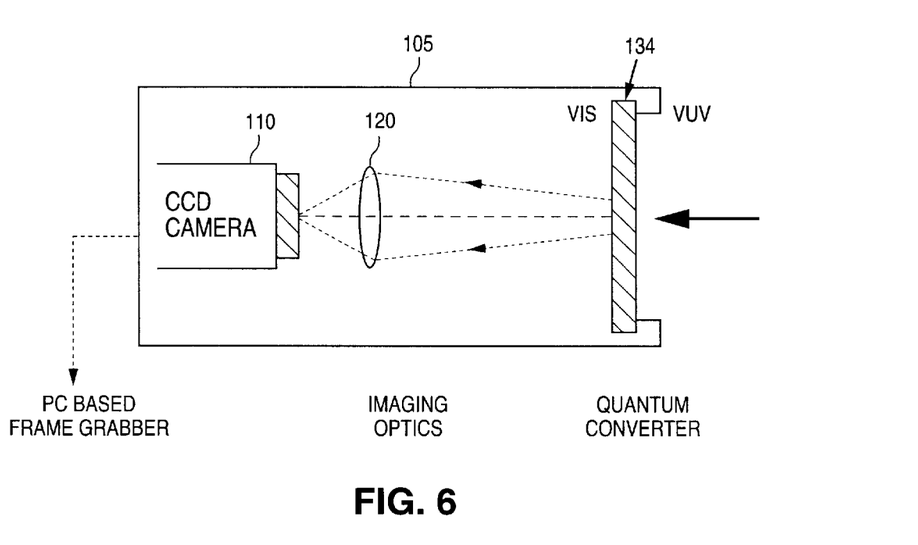
FIG. 6 illustrates a VUV camera arrangement including a quantum converter according to a preferred embodiment.

FIG. 6 illustrates a VUV camera arrangement including a quantum converter 134 according to a preferred embodiment. The camera 110 is shown within a housing 105. VUV light enters from the right of FIG. 6 through the quantum converter 134. The quantum converter 134 changes the VUV light to visible light, as described above. The visible light is then imaged by imaging optics 120 to the CCD camera 110. The VUV light may enter from the enclosure 4 through the window 13 to FIG. 1, wherein the VUV camera of FIG. 6 is sealably coupled to the port 7a by flange 52 of FIG. 2. FIG. 6 has the quantum converter 134 placed outside the enclosure 4 within the housing 105, which is alternative to the positioning of the quantum converter 134 within the enclosure before the window 13 of the port 7a to which the CCD camera is coupled with the flange 52. The quantum converter 134, may be otherwise disposed along the enclosed beam path of each of the far field and near field beams, i.e., after the mirrors 40c and 32, respectively, and before the camera 110 itself. A signal is shown going to a PC based frame grabber for processing of the beam profile data (see FIGS. 3–5).

Figure 7:
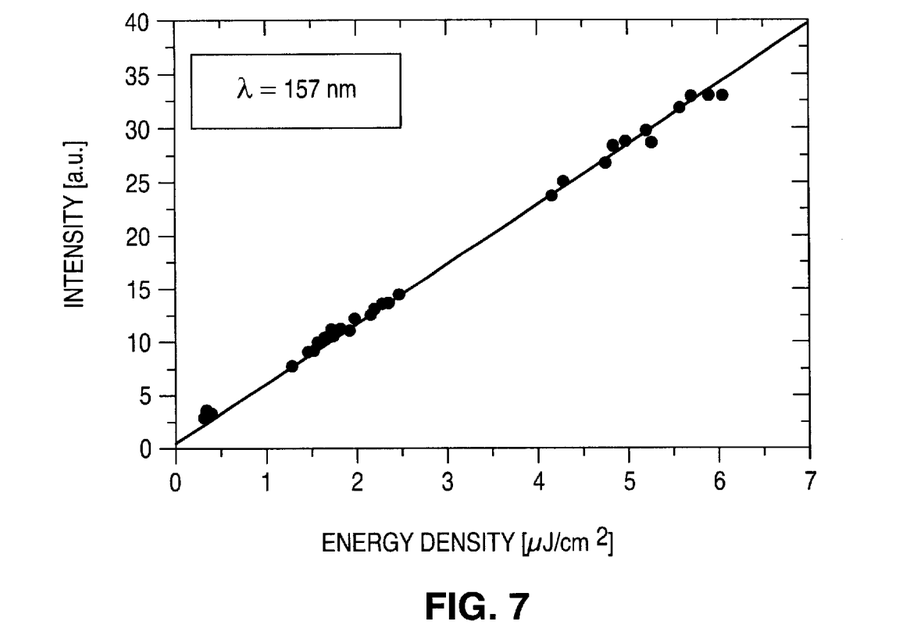
FIG. 7 is a graph of intensity versus energy density for the VUV camera arrangement of FIG. 6 illustrating linearity of fluorescence glass used with the quantum converter.

FIG. 7 is a graph of intensity versus energy density for the VUV camera arrangement arrangement of FIG. 6 illustrating linearity of fluorescence glass used with the quantum converter 134. The measurements used were integrated over the full beam profile. FIG. 7 shows that the intensity of a 157 nm beam profile received at the CCD camera via the quantum converter 134 has a substantially linear dependence on the incident energy density at least up to around 6 $\mu J/cm^2$.

Figure 8:
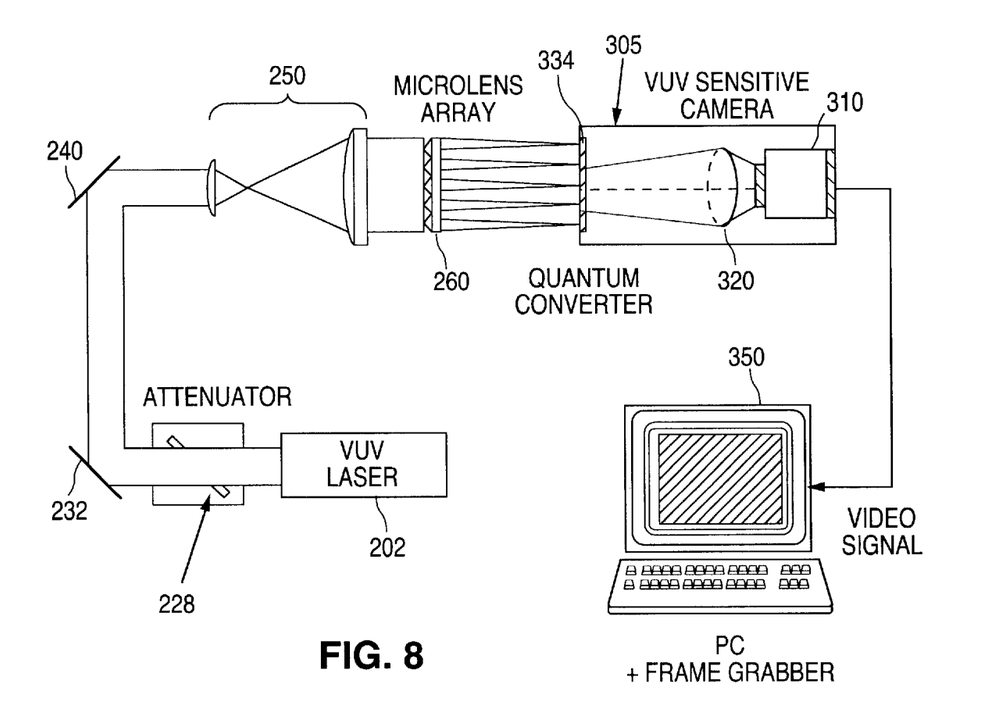
FIG. 8 illustrates an alternative arrangement for precision measurement of beam properties for wavefront and individual beam divergence for a VUV laser beam.

FIG. 8 illustrates an alternative arrangement for precision measurement of beam properties for wavefront and individual beam divergence for a VUV laser beam. A VUV laser 202 is shown schematically emitting a VUV beam. The VUV beam is preferably everywhere along its beam path protected within a beam path enclosure (not shown), either evacuated or purged with an inert gas, or both, as described above with respect to the enclosure 4 of FIG. 1. The VUV beam is attenuated at the attenuator 228, which is preferably a reflective attenuator such as is described at U.S. patent application Ser. No. 60/178,620, which is assigned to the same assignee and is hereby incorporated by reference. The attenuated beam is shown being reflected by mirrors 232 and 240.

The beam reflected from mirror 240 is then expanded at a beam expander 250 including a pair of lenses. The beam expander 250 may include reflective optics or one or more beam expanding prisms. By traversing the beam expander 250, beam divergence is also reduced. The expanded beam then passes through a microlens array 260 whereby the beam becomes a plurality or array of wavelets. These wavelets are then incident at a VUV sensitive camera such as that shown and described with respect to FIG. 6, above. The camera includes a housing 305, wherein the window includes a quantum converter 334 for changing the incident VUV light to preferably visible light. The converted light is then imaged on the camera array 310 by an imaging lens 320. The camera sends a video signal to a PC 350 having frame grabber software for processing similar to that described above with respect to FIGS. 3–5.

The preferred embodiments shown at FIGS. 1–8, and described above achieve a beam profile measurement apparatus that is advantageous over conventional systems, particularly for VUV beam profile measurements. The VUV beam and split off beam portions are protected within the enclosure 4. The near and far field measurements may be performed simultaneously, or alternatively may be performed separately. In addition, a main beam may be split off before the enclosure 4 for applications processing, or may exit from the enclosure, such as through port 7b without having the energy detector 12 coupled thereto. In this embodiment, the energy detector may be coupled to another port, e.g., 18a, 18b or 18c, and the optics adjusted accordingly, or the energy detector 12 may be disposed separately from the enclosure 4. A highly linear quantum converter 34, 134 is used and so any of a variety of conventional cameras can be used without being degraded by VUV light, which is absorbed at the converter 34, 134 in exchange for longer wavelength light while preserving the image to be measured.

Additional features of the preferred embodiments include the compact and even portable nature of the beam profiler, which may be referred to as a "table-top" beam profiler, being only 440 mm by 340 mm, not including the detector 12 and camera 10, in a preferred embodiment. In this way, the beam profiler may be used as a service tool, wherein laser servicing may be performed by positioning the beam profiler to receive the laser beam at a service location, such as in a configuration similar to that shown at FIG. 1. In addition, the beam profiler may be an installed tool that is part of an overall laser system.

The enclosure 4 is evacuated to preferably less than 0.05 mbar and/or purged with an inert gas such as $N_2$ or Ar to prevent photoabsorbing species from attenuating the VUV beam. The enclosure is preferably configured such that with evacuation or purging with an inert gas may be performed, or both, such as is described above, wherein the enclosure 4 is roughly pumped and backfilled with the inert gas a number of times until the atmosphere is sufficiently free of VUV photoabsorbing species such as water vapor, oxygen and hydrocarbons.

A mounting plate for the optics within the enclosure 4 is preferably mechanically separated from the enclosure 4, such as by feedthroughs from the optics to the mounting plate outside the enclosure 4. High stability is achieved in this way and the optics may then be adjusted without contaminating the prepared atmosphere within the enclosure 4. In addition, by folding the beam paths at several folding mirrors, the optical setup is compact.

The enclosure 4 is versatile and allows the beam exit to be re-locatable to another port, e.g., 18a, 18b or 18c. This feature allows alignment to the wavelength dispersion of at least one of the beam splitters 20 or 24. The near and far field beam paths are also adjustable from the outside using feedthroughs, so that the protective atmosphere inside the enclosure 4 is maintained during the adjustment.

The far field beam path is folded. This allows the enclosure dimensions to be relatively small, while a long focal length lens may be used for achieve greater resolution than one having, e.g., a focal length on the order of the dimension of the enclosure 4. The far field lens is preferably also adjustable for measurement of the beam caustic, which is spot shifted through the best focus location. The imaging lens 30 used for imaging the near field profile, while an alternative approach would not use a lens for imaging the near field profile, advantageously adapts the ratio of the diameters of the near and far field.

One or both beam splitters 20, 24 are mounted with a front stopping face. This allows a quick and adjustment free exchange of a beam splitter 20, 24, e.g., for mirrors when the energy monitor 12 is not included or only one or the near and far field profiles are to be measured, or for adjustment purposes and/or to increase the sensitivity of the measruements.

The quantum converter 34 is preferably attached by magnets to the enclosure 4 in the embodiment of FIG. 1. This allows a quick and dust free exchange to be performed.

The mirrors 22, 26, 32, 40a, 40b and 40c are preferably made of aluminum over BK7. This allows for easy optical adjustments using a pilot beam from, e.g. an $F_2$ laser.

The CCD camera, external to the enclosure, is preferably synchronized by the laser trigger (see the 6,020,723 patent, incorporated by reference above). In addition, attenuators 28 and 36 and cut-off filters 44a, 44b, 46, 48 may be exchangeable during operation from outside the enclosure 4 in a preferred embodiment.

In addition, the preferred arrangement permits imaging of a definite location on the beam path of the beam cross section onto the quantum converter screen. In this way, the imaging is performed at the precise location where the beam profile is measured.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. In particular, the invention is to be interpreted in accordance with the appended claims, and equivalents thereof, without limitations being read from the specification above.

Non-exhaustive examples of alternatives include measurement of the beam profile using photographic paper. An x-y aperture may be used and the beam profile may be measured using scanning steps. A beam splitter may be used for performing near and far field measurements separately.

What is claimed is:

1. A beam characterization monitoring apparatus for receiving an input VUV beam and measuring a beam profile characteristic of the beam, comprising:

an enclosure having an interior substantially free of VUV photoabsorbing species and configured for receiving the input VUV beam therein;

at least a first beam splitter for separating the input VUV beam into at least a first component for measuring a near field beam profile characteristic and a second component for measuring a far field beam profile characteristic; and at least a first detector coupled with the enclosure via a beam path substantially free of VUV photoabsorbing species for detecting at least one of the first component and the second component.

2. The apparatus of claim 1, further comprising a processor for receiving data from the detector of said at least one of the first and second components and for determining at least one of said near field and far field beam profile characteristics, respectively.

3. The apparatus of claim 1, further comprising a focusing lens disposed within the enclosure along the beam path of the second component.

4. The apparatus of claim 1, further comprising an imaging lens disposed within the enclosure along the beam path of the first component.

5. The apparatus of claim 1, further comprising:
a second beam splitter for separating a third component from the VUV input beam for measuring an energy of the third component; and
a second detector coupled with the enclosure via a beam path substantially free of VUV photoabsorbing species for detecting the energy of the third component.

6. The apparatus of claim 1, further comprising a quantum converter disposed along the beam path of the first detector for converting the VUV beam into a beam having a wavelength above 240 nm.

7. The apparatus of claim 6, wherein the quantum converter is disposed within the enclosure.

8. The apparatus of claim 6, wherein the quantum converter is disposed along said beam path that is substantially free of photoabsorbing species coupling said first detector with said enclosure.

9. The apparatus of claim 1, wherein said enclosure further comprises at least one adjustable mirror for extending and adjusting the length of the beam path of the second component while maintaining the interior of the enclosure substantially free of VUV photoabsorbing species.

10. The apparatus of claim 1, wherein said first detector is configured to receive and detect each of said first and second components simultaneously.

11. The apparatus of claim 1, further comprising a near field mirror for directing said first component to the first detector and a far field mirror for directing said second component also to the first detector, and wherein one of said far field mirror and said near field mirror is positioned such that one of said first and second components, respectively, just clears said one of said far field mirror and said near field mirror before being incident upon the first detector.

12. The apparatus of claim 1, further comprising:
a first attenuator disposed along the beam path of the first component; and
a second attenuator disposed along the beam path of the second component.

13. A beam characterization monitoring apparatus for receiving an input VUV beam and measuring a beam profile characteristic of the beam, comprising:
an enclosure having an interior substantially free of VUV photoabsorbing species and configured for receiving the input VUV beam therein;
a first detector coupled with the enclosure via a beam path substantially free of VUV photoabsorbing species for detecting a beam profile characteristic of the input VUV beam; and
a quantum converter disposed along the beam path before the first detector for converting the VUV beam into a beam having a wavelength above 240 nm.

14. The apparatus of claim 13, wherein the quantum converter is disposed within the enclosure.

15. The apparatus of claim 13, wherein the quantum converter is disposed along said beam path that is substantially free of photoabsorbing species coupling said first detector with said enclosure.

16. The apparatus of claim 13, wherein said enclosure further comprises at least one adjustable mirror for extending and adjusting the length of the beam path before the first detector while maintaining the interior of the enclosure substantially free of VUV photoabsorbing species.

17. The apparatus of claim 13, further comprising at least a first beam splitter for separating the input VUV beam into at least a first component for measuring a near field beam profile characteristic and a second component for measuring a far field beam profile characteristic.

18. The apparatus of claim 17, wherein said first detector is configured to receive and detect each of said first and second components simultaneously.

19. The apparatus of claim 17, further comprising a near field mirror for directing said first component to the first detector and a far field mirror for directing said second component also to the first detector, and wherein one of said far field mirror and said near field mirror is positioned such that one of said first and second components, respectively, just clears said one of said far field mirror and said near field mirror before being incident upon the first detector.

20. The apparatus of claim 17, further comprising a focusing lens disposed within the enclosure along the beam path of the second component.

21. The apparatus of claim 17, further comprising an imaging lens disposed within the enclosure along the beam path of the first component.

22. The apparatus of claim 13, further comprising:
a beam splitter for separating a component from the VUV input beam for measuring an energy of the component; and
a second detector coupled with the enclosure via a beam path substantially free of VUV photoabsorbing species for detecting the energy of the component.

23. A beam characterization monitoring apparatus for receiving an input VUV beam and measuring a beam profile characteristic of the beam, comprising:
an enclosure having an interior substantially free of VUV photoabsorbing species and configured for: receiving the input VUV beam therein;
a first beam splitter for separating the input VUV beam into at least a first component for measuring a beam profile characteristic and a second component for measuring an energy characteristic of the input VUV beam;
a first detector coupled with the enclosure via a beam path substantially free of VUV photoabsorbing species for detecting the first component; and
a second detector coupled with the enclosure via a beam path substantially free of VUV photoabsorbing species for detecting the second component.

24. The apparatus of claim 23, further comprising a second beam splitter for separating the first component into at least a third component for measuring a near field beam profile characteristic and a fourth component for measuring a far field beam profile characteristic.

25. The apparatus of claim 24, wherein said first detector is disposed to detect each of said third and fourth components simultaneously.

26. The apparatus of claim 24, further comprising a near field mirror for directing said third component to the first detector and a far field mirror for directing said fourth component also to the first detector, and wherein one of said far field mirror and said near field mirror is positioned such that one of said third and fourth components, respectively, just clears said one of said far field mirror and said near field mirror before being incident upon the first detector.

27. The apparatus of claim 24, further comprising a focusing lens disposed within the enclosure along the beam path of the fourth component.

28. The apparatus of claim 24, further comprising an imaging lens disposed within the enclosure along the beam path of the third component.

29. The apparatus of claim 24, wherein said enclosure further contains at least one adjustable mirror for extending and adjusting the length of the beam path of the fourth component while maintaining the interior of the enclosure substantially free of VUV photoabsorbing species.

30. The apparatus of claim 23, further comprising a quantum converter disposed along the beam path of the first detector for converting the VUV beam into a beam having a wavelength above 240 nm.

31. The apparatus of claim 30, wherein the quantum converter is disposed within the enclosure.

32. The apparatus of claim 30, wherein the quantum converter is disposed along said beam path that is substantially free of photoabsorbing species coupling said first detector with said enclosure.

33. A beam characterization monitoring apparatus for receiving an input VUV beam and measuring a beam profile characteristic of the beam, comprising:

an enclosure having an interior substantially free of VUV photoabsorbing species and configured for receiving the input VUV beam therein;

at least a first detector coupled with the enclosure via a beam path substantially free of VUV photoabsorbing species for detecting a far field beam profile of the input VUV beam; and a focusing lens for focusing the far field beam profile of the VUV input beam to the detector for measuring a far field beam profile characteristic of the VUV input beam.

34. The apparatus of claim 33, further comprising a quantum converter disposed along the beam path of the first detector for converting the VUV beam into a beam having a wavelength above 240 nm.

35. The apparatus of claim 34, wherein the quantum converter is disposed within the enclosure.

36. The apparatus of claim 34, wherein the quantum converter is disposed along said beam path that is substantially free of photoabsorbing species coupling said first detector with said enclosure.

37. The apparatus of claim 33, further comprising:

a first beam splitter for separating the input VUV beam into at least a first component for measuring the far field beam profile characteristic and a second component for measuring an energy characteristic of the input VUV beam; and a second detector coupled with the enclosure via a beam path substantially free of VUV photoabsorbing species for detecting the second component.

38. The apparatus of claim 37, further comprising a second beam splitter for separating the first component into at least a third component for measuring a near field beam profile characteristic and a fourth component for measuring a far field beam profile characteristic.

39. The apparatus of claim 33, further comprising a beam splitter for separating the input VUV beam into at least a first component for measuring a near field beam profile characteristic and a second component for measuring the far field beam profile characteristic.

40. A beam characterization monitoring apparatus for receiving an input VUV beam and measuring a beam profile characteristic of the beam, comprising:

an enclosure having an interior substantially free of VUV photoabsorbing species and configured for receiving the input VUV beam therein; and at least a first detector coupled with the enclosure via a beam path substantially free of VUV photoabsorbing species for detecting a near field beam profile of the input VUV beam.

41. The apparatus of claim 40, further comprising an imaging lens for focusing the near field beam profile of the VUV input beam to the detector for measuring a near field beam profile characteristic of the VUV input beam.

42. The apparatus of claim 40, further comprising a quantum converter disposed along the beam path of the first detector for converting the VUV beam into a beam having a wavelength above 240 nm.

43. The apparatus of claim 42, wherein the quantum converter is disposed within the enclosure.

44. The apparatus of claim 42, wherein the quantum converter is disposed along said beam path that is substantially free of photoabsorbing species coupling said first detector with said enclosure.

45. The apparatus of claim 40, further comprising:

a first beam splitter for separating the input VUV beam into at least a first component for measuring the near field beam profile characteristic and a second component for measuring an energy characteristic of the input VUV beam; and a second detector coupled with the enclosure via a beam path substantially free of VUV photoabsorbing species for detecting the second component.

* * * * *